United States Patent
Engberg et al.

(12) 
(10) Patent No.: US 6,181,863 B1
(45) Date of Patent: Jan. 30, 2001

(54) LAMINATION OF OPTICAL FIBER FLEXFOILS

(75) Inventors: Kristian Engberg, Sollentuna; Hjalmar Hesselbom, Huddinge, both of (SE)

(73) Assignee: Telefonaktiebolaget LM Ericsson (publ), Stockholm (SE)

(*) Notice: Under 35 U.S.C. 154(b), the term of this patent shall be extended for 0 days.

(21) Appl. No.: 09/024,218

(22) Filed: Feb. 17, 1998

(30) Foreign Application Priority Data

Feb. 18, 1997 (SE) .................................................. 9700562

(51) Int. Cl.$^7$ ...................................................... G02B 6/44
(52) U.S. Cl. .............................. 385/136; 385/114; 385/80
(58) Field of Search .............................. 385/14, 80, 114, 385/59, 53, 86; 525/221; 428/608

(56) References Cited

U.S. PATENT DOCUMENTS

| | | | |
|---|---|---|---|
| 3,936,277 | * 2/1976 | Jakway et al. | 428/608 |
| 4,364,788 | 12/1982 | Bloodworth, Jr. et al. | 156/179 |
| 5,259,051 | 11/1993 | Burack et al. | 385/14 |
| 5,394,504 | * 2/1995 | Burack et al. | 385/139 |
| 5,536,787 | * 7/1996 | Scholz et al. | 525/221 |
| 5,582,673 | 12/1996 | Burack et al. | 385/80 |
| 5,611,017 | * 3/1997 | Lee et al. | 385/114 |
| 5,932,298 | * 8/1999 | Moon | 427/496 |

* cited by examiner

Primary Examiner—Hemang Sanghavi
Assistant Examiner—Ellen E. Kim
(74) Attorney, Agent, or Firm—Burns, Doane, Swecker & Mathis, L.L.P.

(57) ABSTRACT

An optical fiber flexfoil includes optical fibers adhesively bonded between two flexfoils laminated to each other. A surface of a base flexible plastic sheet is coated with a pressure sensitive adhesive, and optical fibers are bonded to the sheet by the adhesive. A top foil having a similar coating is placed on top of the base foil contacting the optical fibers, air located between the foils is removed, and the foils are pressed against each other only by the adhesive coatings. The adhesive is selected to have a low glass transition temperature such as below −50° C., and to exhibit viscoelastic characteristics in the temperature range within which the flexfoil is to be used. The lamination of the foils is made at temperatures at the upper limit of the operational range using only moderate pressures. This gives low mechanical stresses on the fibers in the pressing operation. The fibers are not entirely rigidly fixed to the foils allowing them to move a little when bending the flexfoil, so that rather sharp bends of the flexfoil can be made. Also, microbends formed in the lamination process can relax and thus be eliminated, producing a low attenuation in the optical fibers

10 Claims, 2 Drawing Sheets

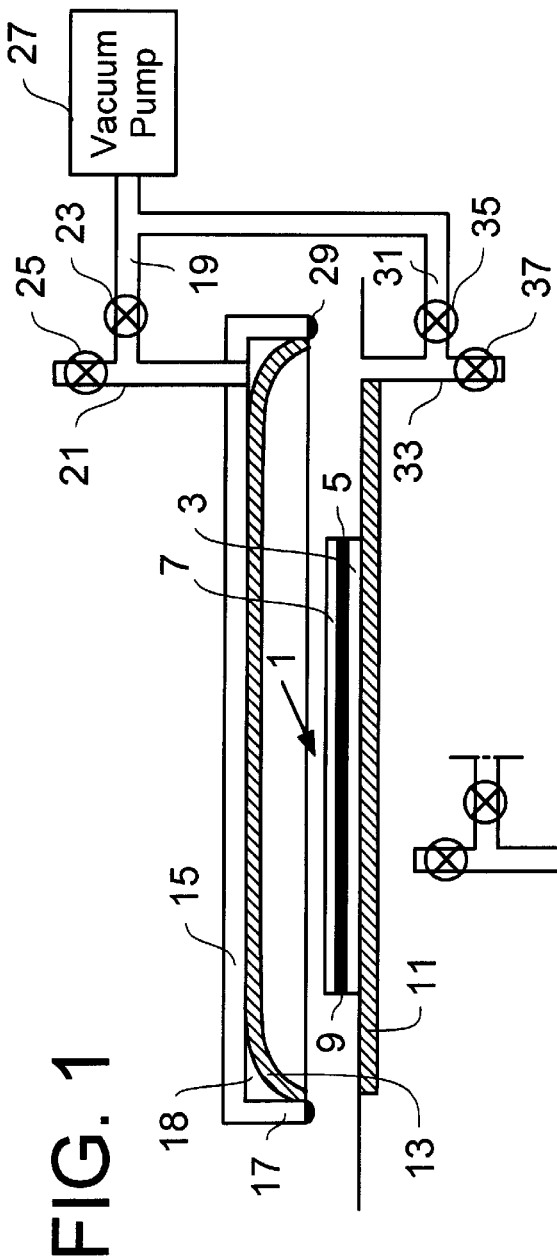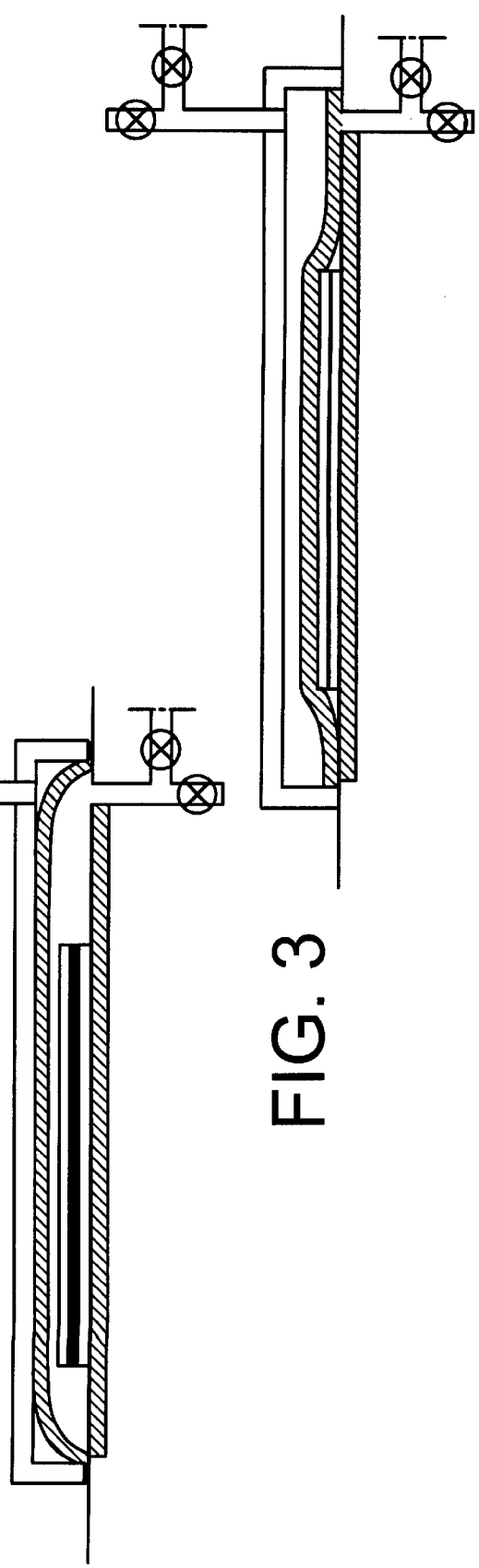

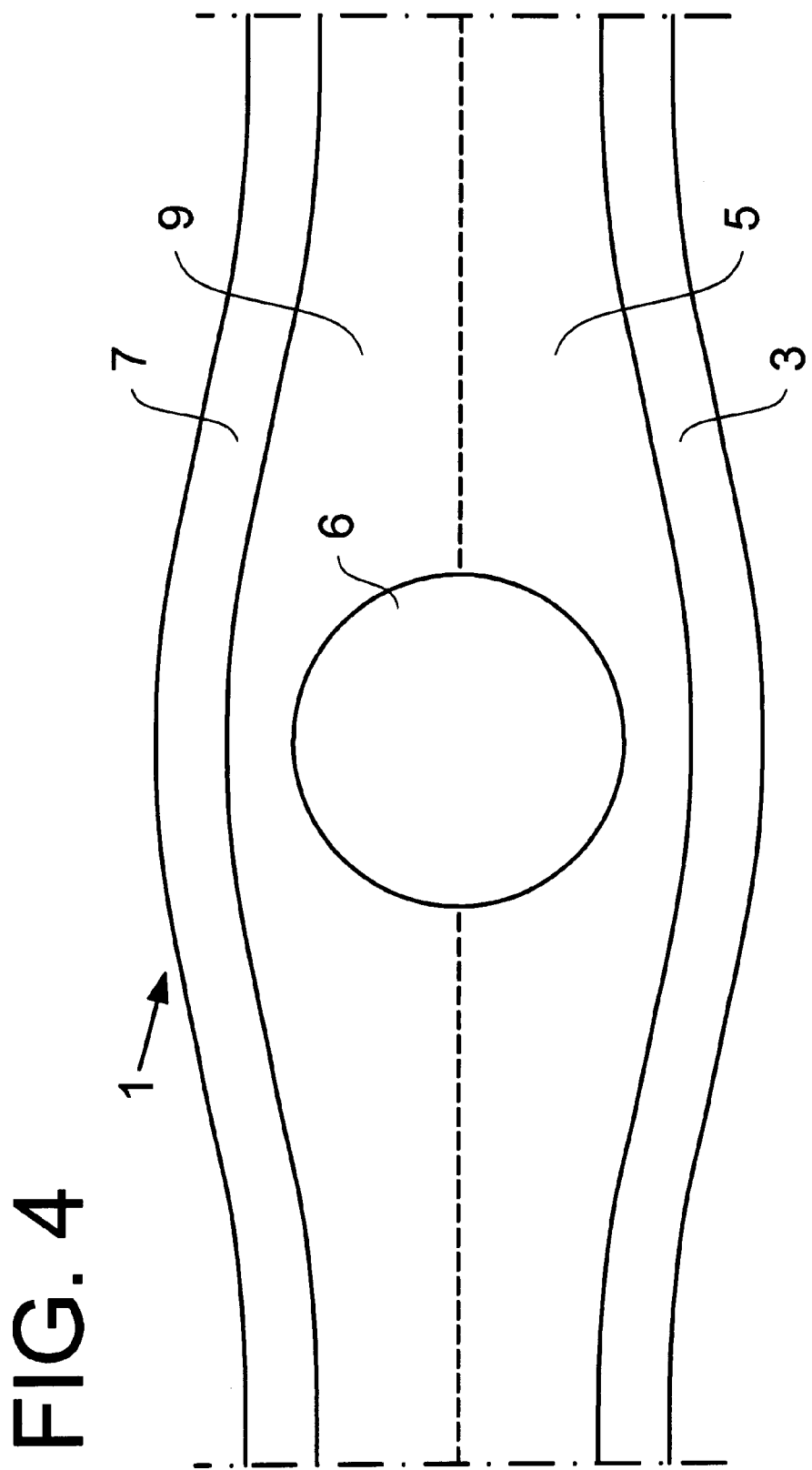

LAMINATION OF OPTICAL FIBER FLEXFOILS

This application claims priority under 35 U.S.C. §§119 and/or 365 to SW 9700562-3 filed in Sweden on Feb. 18, 1997; the entire content of which is hereby incorporated reference.

The invention relates to producing optical fiber flexfoils, i.e. two flexible sheets having optical fibers arranged therebetween.

BACKGROUND

Future demands on communication systems include increased component densities in the apparatus used and larger bandwidths. The data rates of computers, telecommunication, etc. are permanently increasing. Due to restriction in space and the high impedance characteristics of thin electrical lines, a higher component density on printed circuit boards, PCBs, results in difficulties in providing a sufficient number of electrical connections to a backplane, BP. Due to the large bandwidth and low signal loss that optical fibers exhibit, optical interconnections used for signal transmission internally on circuits boards and between boards may reduce these problems.

Thus, optical communication, well established since long times in long distance broad band communications, is also being introduced for short range applications inside telecommunication exchanges and computers, etc. For such applications the number of optical interconnections may become significant. However, a large number of loose optical fibers mounted on PCBs or BPs or connected thereto will give an unmanageable building practice. Optical fiber management is one of the key factors that have to be solved in order to successfully implement the use of short range optical interconnections. One practical approach thereto is to use a physically or geometrically separate optical level to house all the optical connections. A suitable such short range, separate optical interconnecting medium comprises optical fibers mounted on or in a flexible substrate called an optical fiber flexfoil.

The optical flexfoil technique has been presented by the company AT&T in e.g. U.S. Pat. No. 5,259,051 for Burack et al. This patent discloses how optical fibers are routed on an adhesive-coated surface using a rotating wheel. In addition the patent describes how optical fibers are encapsulated between two plastic foils, using two heated cylinders. AT&T's technique includes a thermoplastic filler which is added to the base flexfoil as an extra layer before the lamination in order to encapsulate and protect the fibers. The thermoplastic filler, which is molten by the two heated cylinders laminating a top foil to the thermoplastic layer, seals the fiber flexfoil. In order to melt the filler and in order to laminate the flexfoil without trapping air, high temperatures and high lamination pressures are required.

SUMMARY

It is an object of the invention to provide a method and a device for making flexfoils using optical fibers which are capable of being bent at small curvatures.

It is another object of the invention to provide a method and a device for making flexfoils using optical fibers not subjecting the fibers to high temperatures or to localized mechanical stresses.

Thus, the problem to be solved by the invention is how to produce an optical fiber flexfoil allowing it to be acutely bent and in particular how to produce the flexfoil so that the individual fibers are not subjected to unsatisfactory stresses such as microbends when the flexfoil is produced or bent. In particular the problem involves how to achieve that the fibers have some movability in the flexfoil.

Thus, generally an optical fiber flexfoil comprises optical fibers adhesively bonded between two flexible foils laminated to each other. For producing the flexfoil a surface of a base flexible plastic sheet or base foil is coated with a pressure sensitive adhesive and optical fibers are applied in predetermined paths to the coated surface and bonded to the base foil by the adhesive. A top foil that is identical to the base foil is placed at the surface of the base foil, so that its surface having the pressure sensitive adhesive will come in contact with the optical fibers, air located between the foils is removed and the top foil and the base foil are moderately heated and pressed against each other to make them bond to each other only by the coatings of the pressure sensitive adhesive. The adhesive is selected to have a low glass transition temperature such −50° C. and to exhibit viscoelastic characteristics at least in the temperature range where the flexfoil is to be used. The pressing temperature is located immediately above or in the topmost part of the operational temperature range.

In this production method no additional thermoplastic filler between the foils is used. The type and thickness of the pressure sensitive adhesive must be selected appropriately. A pressure sensitive adhesive may generally be processed at a fairly low temperature of e.g approximately 70° C. This shall be compared to temperatures in the range of 130–160° C. which must be used for the thermoplastic polyurethane used in the cited U.S. patent. The acrylic primary coating of the fibers may be degraded at such high temperatures. Further, a pressure sensitive adhesive generally does not solidify when the temperature is lowered, i.e. such an adhesive exhibits a viscoelastic behaviour at the operational temperatures of the flexfoil in the range of −40 to 80° C. The viscoelastic properties of the adhesive makes it possible for the encapsulated fibers to move somewhat in the laminated structure also when the finished flexfoil is used at ambient temperatures. Microbends introduced during the lamination process will therefore relax, giving the optical fibers in the flexfoil a very low optical attenuation.

If heated cylinders would be used in the lamination process for pressing the two foils against each other, a high cylinder pressing force must be applied in order to produce a laminate having no enclosed air bubbles. It has been shown that micro-cracks are easily formed in the fibers during the rolling operation due to the localized pressing force. In particular there is a definite danger of causing bending of fibers at very small radii such as approximately equal to the radius of the fibers in regions of the fibers where fibers cross each other. This avoided for a vacuum lamination process, which also is faster and generally subjects the fibers to minimum mechanical stresses. The overall pressure in the lamination process can then be made smaller, this reducing even more the risk of bending the fibers at too small radii at fiber crossings.

In such an optical fiber flexfoil the two foils are thus bonded to each other only by the same adhesive as the optical fibers are bonded to the foils and also by the same adhesive as by means of which they are bonded during the initial step of laying-out of the fibers on one of the foils. The optical fibers are thus substantially completely embedded in a pressure sensitive adhesive occupying substantially all of the place between the flexible foils except that of the optical fibers. The two adhesive layers can have a total thickness smaller than the exterior diameter of the embedded fiber, and then the distance between the facing surfaces of the flexible component foils in the finished flexfoil, at places distant from the optical fibers, will generally be smaller than the exterior diameter of the optical fibers, the places where the fibers are located forming low ridges at the exterior surfaces of the component foils.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 1 is a cross-sectional view of a lamination apparatus having an assembly for making an optical fiber flexfoil placed therein, the apparatus being illustrated in a position where the assembly is in and can be placed in the apparatus and also be removed therefrom, FIG. 2 is a cross-sectional view similar to FIG. 1 illustrating the apparatus in an evacuation stage, FIG. 3 is a cross-sectional view similar to FIG. 1 illustrating the apparatus in a laminating stage, and FIG. 4 is a cross-sectional view illustrating a fiber embedded between two plastic foils.

DETAILED DESCRIPTION

In FIG. 1 a schematic cross-sectional view of an apparatus for laminating an optical fiber flexfoil 1 is illustrated. The flexfoil 1 comprises a base foil 3 made of a flexible plastic sheet coated with a layer 5 of a pressure sensitive adhesive agent on one of its surfaces, see also the sectional view in FIG. 4. Optical fibers 6, see FIG. 4, are applied in suitable paths on the surface having the adhesive. A top foil 7 is substantially identical to the base foil 3 and has an adhesive coating 9 on its bottom surface and is placed on top of and thus at the adhesive-coated surface the base foil 3. The flexfoil structure 1 is placed on top of a flexible rubber bottom sheet 11 which is placed at a bottom surface of the apparatus and on the bottom of the closed chamber to be formed for the actual laminating operation. The bottom rubber sheet 11 extends well beyond the edges of the foils 3, 7. A flexible rubber top sheet 13 is located at a distance above the flexfoil assembly and is only at its marginal portions attached to a lid 15 and in particular to the lower part of borders 17 projecting downwards from the lid 15. The space between the upper side of the top sheet 13 and the interior side of the lid 15 forms a closed cavity 18, that is connected through pipes 19, 21 having shut-off valves 23, 25 to a vacuum pump 27 and to free air respectively. In the position illustrated in FIG. 1 the valves 23, 25 are set so that there is a vacuum in the cavity 18 above the top sheet 13 and thus this sheet is lifted up and contacts the inner surface of the lid 15 over its main portion.

The lid 15 together with the attached rubber sheet 13 is then lowered to contact to base surface of the apparatus and to form an air-tight enclosure of the flexfoil assembly 1 by means of seals 29 which are arranged at the downwards facing edge surfaces of the borders 17 and contact said base surface, as is illustrated in FIG. 2. The closed cavity thus formed is through pipes 31, 33 having valves shut-off valves 35, 37 connected to the vacuum pump 27 and free air respectively, the pipes being attached to the base surface of the apparatus at a position located at the side of the base sheet 11, this position being inside the lid borders 17. The apparatus is all the time maintained at a temperature suitable for laminating. The valves 35, 37 are then set so that the vacuum pump 27 is connected to the cavity and then evacuates the air therefrom and in particular air trapped between the foils 3, 7.

The valves 23, 25 of the lid cavity 18 above the top sheet are then set, see FIG. 3, so that the vacuum pump 27 is disconnected and free air is allowed to enter the cavity 18. Owing to the vacuum in the cavity enclosing the flexfoil assembly 1 the ambient air pressure will then act on the top rubber sheet 13 and it will press the component foils 3, 7 of the flexfoil assembly tightly but still softly to each other. Of course, if higher laminating pressures are required, the pipe 21 could instead be connected to a pump, not shown, for providing a pressure higher than the ambient pressure during the lamination process, but in most cases the ambient air pressure is sufficient. After a suitable time period the top valves 23, 25 are set to again connect the vacuum pump 27 so that the top sheet 13 is lifted up from the flexfoil assembly 1, air is allowed to enter the cavity enclosing the flexfoil by setting the bottom valves 35, 37 appropriately. The lid 15 is lifted up and the finished, laminated flexfoil is removed from the apparatus and allowed to cool.

Thus, at the temperature maintained by the apparatus and subjected to the very smoothly distributed pressure obtained from the hydrostatic-type lamination method and also the moderate pressure used, preferably the ambient air pressure, the flexfoil components are laminated to each other, the two component foils 3, 7 are adhesively bonded to each other only by the identical adhesive layers 5, 9, one of which also being used for bonding the optical fibers to the foil 3 in the initial positioning of the fibers in predetermined paths. If a proper selection of the type and thickness of the pressure sensitive adhesive used for applying the optical fibers to the base foil 3 is made, no additional adhesive material is needed. The adhesive shall possess a glass transition temperature below the temperature range, within which the flexfoil 1 is intended to be used, i.e. below is operational temperature range, in particular well below 0° C. and preferably below 50° C., and it shall possess good high temperature properties.

A pressure sensitive adhesive may be processed at fairly low temperatures, which in any case are above or at the upper-most part of the operational temperature range, typically at temperatures of approximately 70° C. Then there is no risk that the standard acrylic primary coating of the optical fibers embedded in the flexfoil will be degraded during the lamination process. Further, a typical pressure sensitive adhesive exhibits a viscoelastic behavior for temperatures around typical ambient temperatures, e.g. at least in an operational temperature range of −40° C. to 80° C., and thus does not solidify even for relatively low temperatures. The viscoelastic properties of the adhesive within the operational temperature range allow the encapsulated fibers to move somewhat in the laminated structure. Microbends introduced during the lamination process will therefore have a possibility to relax, resulting in a very low optical attenuation for the optical fibers incorporated in the flexfoil 1.

The vacuum lamination method described in fast, uses a relatively low overall pressure and no localized pressure forces are used. The low lamination pressing forces reduces the risk of forming micro-cracks in the optical fibers. Still, there could be some risk of having acute bends at the region of an optical fiber where it crosses another optical fiber, but the low pressure required for the lamination results in a soft bending of fibers where the cross. Owing to the viscoelastic characteristics of the adhesive, possibly such sharp microbends will have a possibility to relax, as has already been discussed.

The base and top foils 3, 7 can be made from polyimide material, e.g. having a thickness of about 50 μm. The adhesive coatings 5, 9 have typically a thickness of about 100 μm and enclose a fiber 6 having a protective primary coating with an exterior diameter of about 250 μm, see in particular the sectional view of FIG. 4, the fiber 6 being totally embedded in the material of the adhesive coatings.

Thus a method has been described allowing a gentle lamination where producing optical flexfoils resulting in optical flexfoils in which there is a very little risk of forming microcracks in and similar damages to the optical waveguides in the flexfoils.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of making an optical fiber flexfoil, comprising the steps of:
   providing a base foil and a top foil,
   coating a top surface of the base foil and a bottom surface of the top foil with a pressure sensitive adhesive,
   applying optical fibers in predetermined paths to the coated top surface of the base foil to be bonded to the base foil by the pressure sensitive adhesive,
   placing the top foil at the top surface of the base foil to make the presentation sensitive adhesive at the bottom surface of the top surface come in contact at least with the optical fibers,
   removing air located between the base foil and the top foil, and
   after removing the air, applying an evenly distributed hydrostatic pressure on the base foil and on the top foil for pressing the top foil and the base foil against each other to bond the top foil and the base foil to each other only by the pressure sensitive adhesive.

2. The method of claim 1, wherein in the step of applying the optical fibers in predetermined paths, the optical fibers are applied to comprise at least one place where one of the optical fibers crosses itself or a different one of the optical fibers.

3. The method of claim 1, wherein the pressure sensitive adhesive has a low glass transition temperature well below 0° C.

4. The method of claim 1, wherein the pressure sensitive adhesive has good high temperature properties allowing it to be processed at temperatures below 100° C. and well above general ambient temperatures.

5. The method of claim 1, wherein the pressure sensitive adhesive has a visco-elastic behaviour at least at temperatures at which the flexfoil is intended to be used.

6. An optical fiber flexfoil comprising:
   two flexible foils,
   a pressure sensitive adhesive coated on facing surfaces of the two flexible foils and binding the two flexible foils to each other,
   optical fibers adhesively bonded between the two flexible foils only by the pressure sensitive adhesive, the pressure sensitive adhesive occupying substantially all of the space between the flexible foils except space occupied by the optical fibers, wherein the distance between the facing surfaces of the two flexible foils, at places between and distant from the optical fibers, is smaller than the exterior diameter of the optical fibers.

7. The optical fiber flexfoil of claim 6, wherein the optical fibers comprise at least one of the optical fibers crossing itself or a different one of the optical fibers.

8. The optical fiber flexfoil of claim 6, wherein the adhesive has a low glass transition temperature well below 0° C.

9. The optical fiber flexfoil of claim 6, wherein the adhesive has good high temperature properties allowing it to be processed at temperatures below 100° C. and well above general ambient temperatures.

10. The optical fiber flexfoil of claim 6, wherein the adhesive has a visco-elastic behaviour at least at temperatures at which the optical fiber flexfoil is intended to be used.

* * * * *